United States Patent
Emigh

(10) Patent No.: US 8,645,480 B1
(45) Date of Patent: Feb. 4, 2014

(54) TRUST REPRESENTATION BY SIMILARITY

(76) Inventor: Aaron T. Emigh, Incline Village, NV (US)

(*) Notice: Subject to any disclaimer, the term of this patent is extended or adjusted under 35 U.S.C. 154(b) by 506 days.

(21) Appl. No.: 12/839,384

(22) Filed: Jul. 19, 2010

Related U.S. Application Data

(60) Provisional application No. 61/226,742, filed on Jul. 19, 2009.

(51) Int. Cl.
*G06F 15/16* (2006.01)
*G06F 11/00* (2006.01)
*G06F 7/04* (2006.01)

(52) U.S. Cl.
USPC .............................. 709/206; 726/22; 726/26

(58) Field of Classification Search
USPC .................................................. 709/206, 249
See application file for complete search history.

(56) References Cited

U.S. PATENT DOCUMENTS

| | | | |
|---|---|---|---|
| 5,195,135 A * | 3/1993 | Palmer | 380/241 |
| 6,216,228 B1 * | 4/2001 | Chapman et al. | 713/176 |
| 6,317,795 B1 * | 11/2001 | Malkin et al. | 709/246 |
| 6,493,744 B1 * | 12/2002 | Emens et al. | 709/203 |
| 8,191,092 B2 * | 5/2012 | Kamen | 725/47 |
| 2002/0147782 A1 * | 10/2002 | Dimitrova et al. | 709/207 |
| 2006/0130118 A1 * | 6/2006 | Damm | 725/135 |
| 2007/0198711 A1 * | 8/2007 | Maring | 709/225 |

\* cited by examiner

*Primary Examiner* — Shirley Zhang

(57) ABSTRACT

In some embodiments, techniques for determining a reputation associated with an electronic document may include receiving a reference image, receiving an electronic document, determining a trustworthiness factor associated with the electronic document, creating a modified reference image, wherein creating the modified reference image includes modifying the reference image to a degree corresponding to the trustworthiness factor, wherein a lower trustworthiness factor corresponds to a greater modification relative to a higher trustworthiness factor; and displaying the modified reference image.

20 Claims, 4 Drawing Sheets

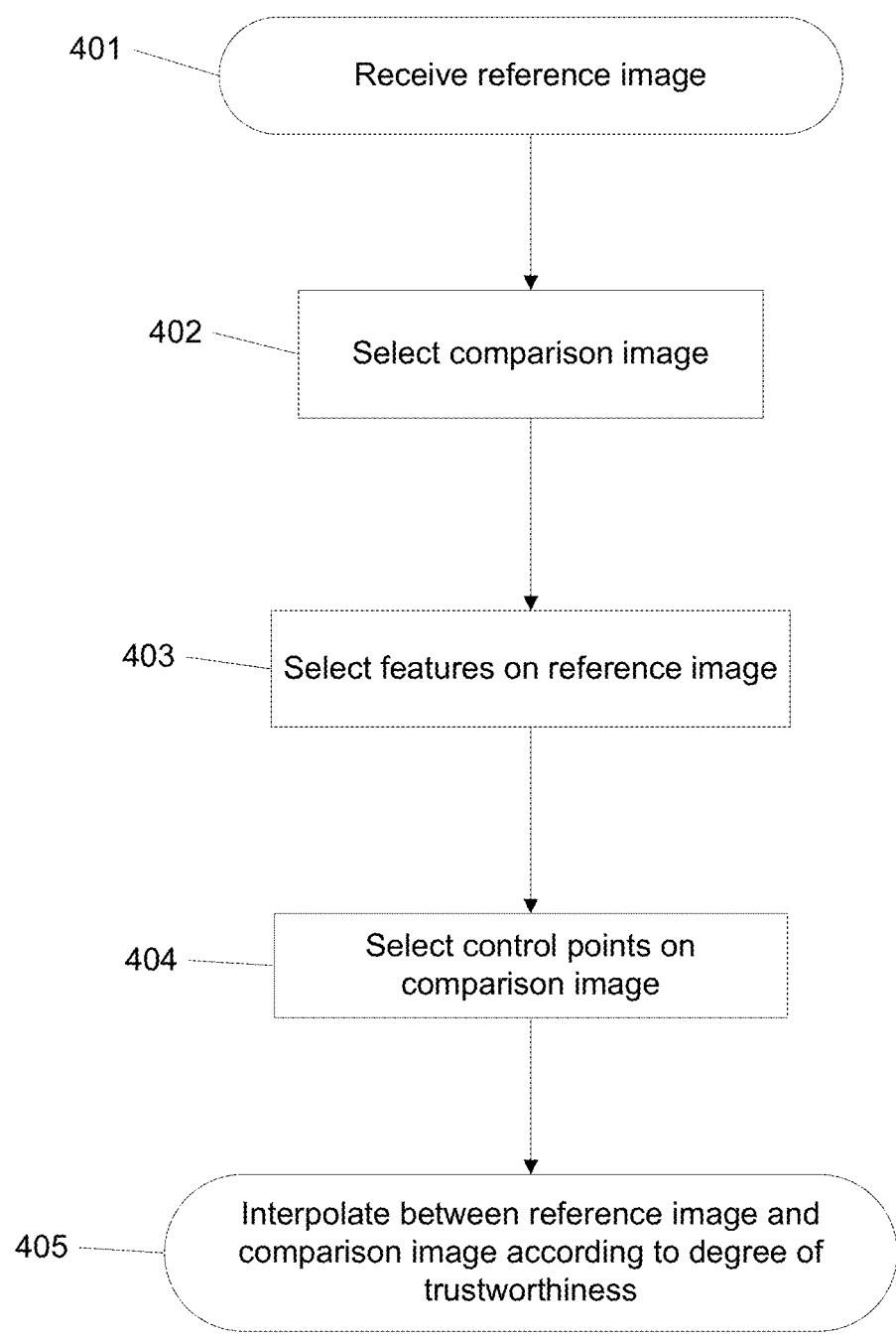

TRUST REPRESENTATION BY SIMILARITY

CROSS-REFERENCE TO RELATED APPLICATIONS

This application claims priority to U.S. Provisional Patent Application No. 61/226,742, entitled INFORMATION PROCCESSING, filed Jul. 19, 2009, which is incorporated herein by reference for all purposes.

FIELD OF THE INVENTION

The present invention relates generally to the area of online security. More specifically, techniques for providing a visual representation of trustworthiness are disclosed.

BACKGROUND OF THE INVENTION

Web sites, emails, and other electronic communications are fraught with fraud and deception. Users are commonly taken in by emails or web sites that seem to originate from trusted sources, but actually do not.

Current approaches to indicating trustworthiness of a site are either highly intrusive (such as requiring users to respond to dialogs), or restrictive (such as refusing to allow users access to unknown or reported-untrustworthy sites), or ineffective (such as providing a visual indicator that is easily ignored by users).

Accordingly, it would be useful to have a way to indicate trustworthiness to a user in a manner that is not intrusive or restricted, but also is not easily ignored.

BRIEF DESCRIPTION OF THE DRAWINGS

Various embodiments of the invention are disclosed in the following detailed description and the accompanying drawings.

FIG. 4 is a flow diagram of a method for morphing between a reference image and a comparison image according to a trustworthiness factor, according to some embodiments.

DETAILED DESCRIPTION

The invention can be implemented in numerous ways, including as a process, an apparatus, a system, a composition of matter, a computer readable medium such as a non-transitory computer readable storage medium (such as a magnetic storage medium, e.g. a disk, an electronic storage medium, e.g. a flash memory, or an optical storage medium, e.g. a CD-ROM or DVD-ROM) or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
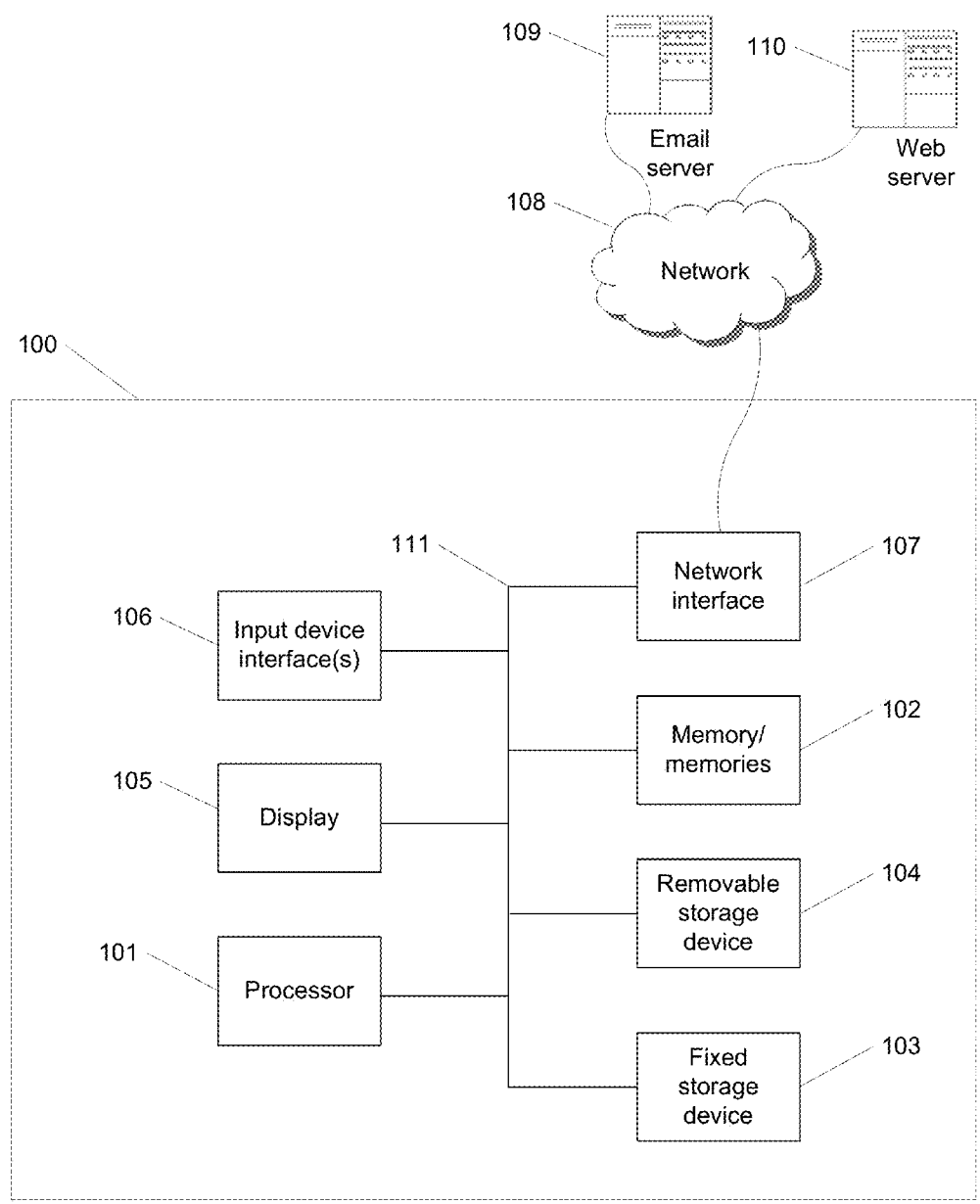
FIG. 1 is a functional diagram illustrating a programmed system for representing trust by similarity, according to some embodiments.

FIG. 1 is a functional diagram illustrating a programmed system for representing trust by similarity, according to some embodiments. As will be apparent, other computer system architectures and configurations can be used to represent trust. In this example, computing device 100, which may be any device that can receive electronic communications, such as a computer, a smartphone, a tablet computer, etc., includes various subsystems as described below. It includes at least one microprocessor subsystem (also referred to as a processor or a central processing unit (CPU)) 101. In various embodiments, processor 101 may be implemented by a single-chip processor or by multiple processors. In some embodiments, processor 101 is a general purpose digital processor. Using instructions retrieved from one or more memories 102, processor 101 controls the reception and manipulation of input data, and the output and display of data on output devices (e.g., display 105). In some embodiments, processor 101 performs the client-side techniques described below in conjunction with the remaining Figures.

Processor 101 is coupled bi-directionally with a memory 102. Memory 102 may comprise multiple memories, and is referred to in the singular purely for expository simplicity. Memory 102 may include a first primary storage, typically a random access memory (RAM), and a second primary storage, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 101. Also as well known in the art, primary storage typically includes basic operating instructions, program code, data and objects used by the processor 101 to perform its functions (e.g., programmed instructions). In some embodiments, primary memory 102 may include any suitable computer-readable storage media, described below, depending on whether, for example, data access needs to be bidirectional or unidirectional. In some embodiments, processor 101 may also directly retrieve and store frequently needed data in one or more cache memories (not shown).

Fixed storage device 103 may provide data storage capacity for computing device 100, and is coupled either bidirectionally (read/write) or unidirectionally (read only) to processor 102. Examples of fixed storage device 103 include computer-readable media such as flash memory, a hard disk drive, an optical storage device such as a DVD-ROM, and other storage devices that retain their data when computing device 100 is powered off. Fixed storage device 103 may store additional programming instructions, data, and the like for processor 101, which may for example be loaded into memory 102 for use by processor 101 as needed. In some embodiments, a removable storage device 104, for example a flash memory card such as an SD card, a Micro SD card, or an SDHC card, provides additional data storage capacity. It will be appreciated that the information retained within storage devices 103, 104 can be incorporated, if needed, in standard fashion as part of memory 102 as virtual memory.

Display 105 may be any form of human-readable display, such as an LCD screen. Display 105 may display text and/or graphics as instructed by processor 101. In various embodiments, display 105 may be integrated with computing device 100, or may be separate and an interface between the two may be included in each respective component.

Input device interface(s) 106 provide interfaces, such as USB, through which user input may be received. Examples include a keyboard, a mouse, and a touchscreen.

Network interface 107 is hardware that provides access to network 108. In some embodiments, such as for wired networks, network interface 110 may include a plug, such as an Ethernet plug. In some embodiments, such as for wireless networks, network interface 107 may include an antenna.

Network 107 may be any type of network, for example a public network such as the internet or a cellular phone network such as a GPRS network. In another example, the network 107 may be an enterprise or home network, a virtual private network, or a wireless network such as an 802.11 or Bluetooth network. In some embodiments, the network 107 may include more than one network. An example of a network 107 including more than one network is a local area network connected to a public network such as the internet. An example of the use of such a network is for a computing device 100 to be connected via a local area network such as an enterprise network (for example via a wireless router), and for the local area network to be connected to email server 109 and/or web server 110 via a public network such as the internet.

Email server 109 is connected, directly or indirectly, to the network 107. Email server 109 provides email to computing device 100 via network 107, for example by SMTP or Exchange protocols.

Web server 110 is connected, directly or indirectly, to the network 107. In some embodiments, web server 110 may be associated with a destination web site as described in conjunction with the remaining figures, and may provide content to computing device 100, such as web page(s) and/or other content associated with an online service, via the network 107, for example by the HTTP protocol.

Bus 111 may provide access between the various subsystems of computing device 100. Bus 111 is illustrative of any interconnection scheme serving to link the subsystems. Other computer architectures having different configurations of subsystems, and various other interconnection schemes, can also be utilized.

The techniques of the remaining figures can be run on the system of this FIG. 1, as described above.

Figure 2:
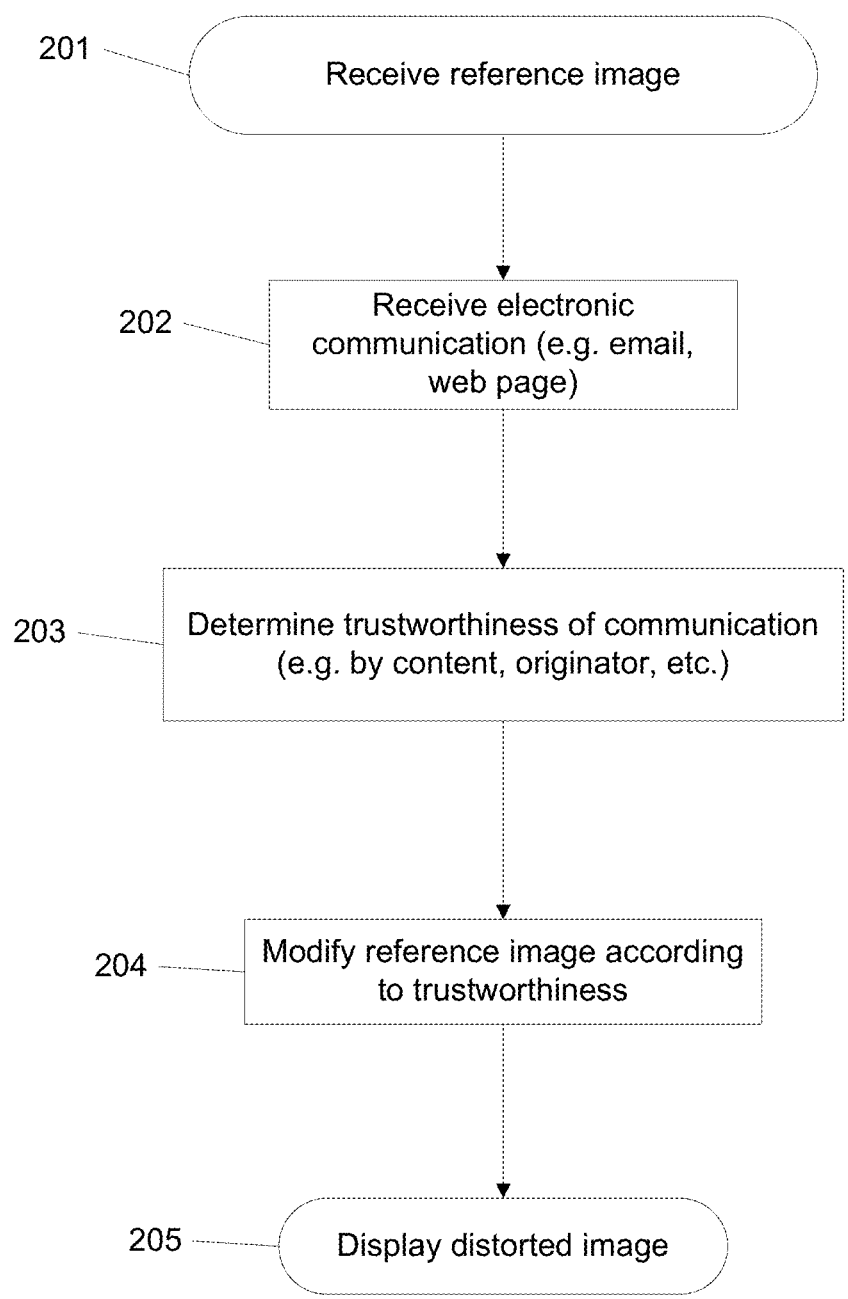
FIG. 2 is a flow diagram of a method for representing trust via image distortion, according to some embodiments.

FIG. 2 is a flow diagram of a method for representing trust via image distortion, according to some embodiments. In this example, a reference image is received (201). In various embodiments, a reference image may be uploaded by a user, selected from among a variety of standard images, received from a profile provider such as a social network (e.g. Facebook), or provided as a standard image. Examples of reference images include an image of a face, such as an image of the user's face or an image of someone's face familiar to the user, such as a family member or friend, an image of a user's pet, an image of a user's family member, and any other image that is easily recognizable to a user, such as an image of a building, such as an image of a user's home or an image of a building selected by a user, or a geometric object of recognizable shape, such as a circle.

An electronic communication may be received (202). Examples of an electronic communication include electronic documents such as an email, a text message such as an SMS, and a web page, which may be received via an electronic network 108 of FIG. 1.

A trustworthiness factor for the electronic communication may be determined (203). In various embodiments, a trustworthiness factor may be derived from any of (or a combination of) many different factors. For example, a trustworthiness factor may be based on a number of times a user has visited a web site, a number of times a trusted associate of a user has visited a web site (for example a "friend" indicated as such by the user, such as one explicitly specified or received via an API from a social network such as Facebook, or an indicated trusted party), a rating by a user, a rating by a trusted associate of a user such as a friend of the user, and/or external trust-related data such as a certificate cryptographically signed by a trusted certificate authority, a determination of the amount of time a domain name has been registered, verification of authentication such as email authentication (e.g. SIDF, DKIM or S/MIME), a reputation service, a number of communications received from the originator of the communication, a number of messages received from the originator of the communication and not rejected as unwanted, a number of times a user has replied to message(s) from the originator of the communication, a feedback rating from customers of the originator of the communication, an independent assessment or reputation associated with the originator of the communication, a feedback rating from vendors to the originator of the communication, and/or analysis of content of the communication.

In some embodiments, a trustworthiness factor may be determined for an entity depicted or mentioned in a document (such as a bank or other institution on a web page), or a seller of an item electronically offered for sale (such as a proprietor of an online store or a seller of an item in an online action).

The reference image may be modified to a degree corresponding to the trustworthiness factor (204). In such a modification, a modification with more similarity may indicate a higher trustworthiness factor (i.e. more trustworthy), while a modification with less similarity may indicate a lower trustworthiness factor (i.e. less trustworthy). Examples of such modifications of the reference images are discussed in conjunction with FIGS. 3 and 4.

The modified reference image may be displayed (205). Display of the modified reference image may be performed in a variety of manners, including in a browser chrome such as browser bar, overlaid in a content window such as a web page or an email (for example in a corner of the screen such as the upper left, upper right, lower left or lower right corner, or in the center of the screen), next to a subject line or a sender line of an email, displayed translucently close to (such as over) content (such as content with which the corresponding trustworthiness factor is associated), etc.

Figure 3:
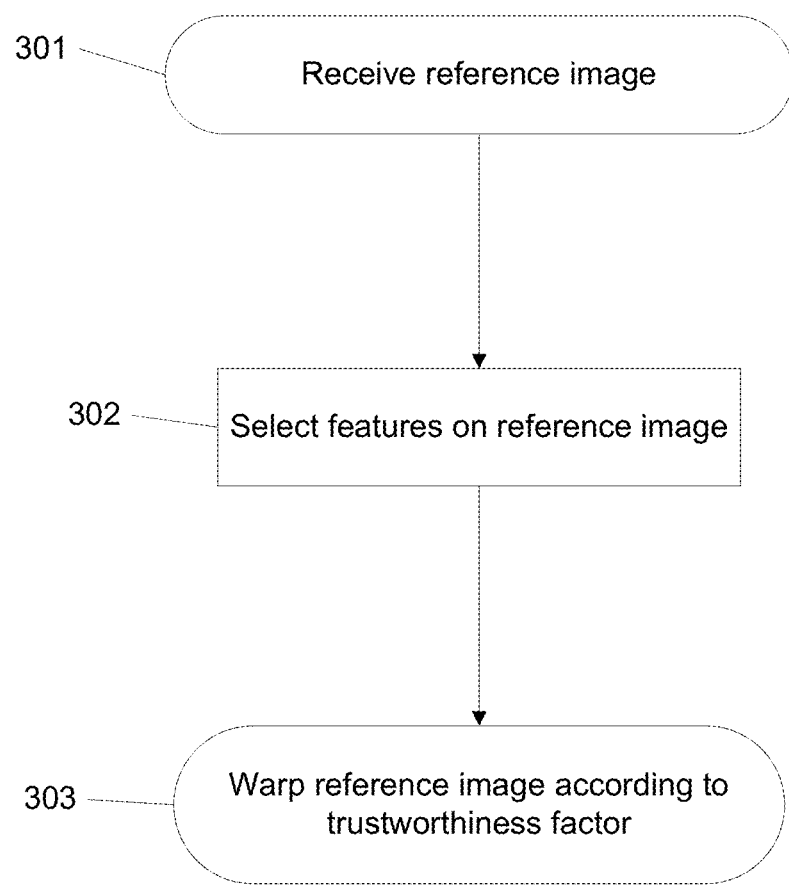
FIG. 3 is a flow diagram of a method for warping a reference image according to a trustworthiness factor, according to some embodiments.

FIG. 3 is a flow diagram of a method for warping a reference image according to a trustworthiness factor, according to some embodiments. In this example, a reference image is received (301), for example as discussed in conjunction with 201 of FIG. 2.

One or more features of the reference image may be selected (302). Examples of features include control points, lines and/or curves. In some embodiments, features may be manually selected by a user, for example by enabling the user to select them with a pointing device on the image itself. In some embodiments, features on the reference image may be automatically selected, for example randomly, or by image analysis to determine suitable control points such as an eye, a nose, a mouth, or the edges of a structure or face.

The reference image may be warped to a degree corresponding to the trustworthiness factor (303). One way to warp the reference is to by moving control points proportionally to the amount that the trustworthiness factor differs from "full" trust (which may for example be defined as a quantification meeting or exceeding a threshold, such as the maximum value, or a fraction of the maximum value such as half the maximum value), and interpolating other points. The image may be accordingly transformed using image warping techniques known to those skilled in the art. For example, point-to-point warping algorithms may be applied that implement a radial basis function transformation, wherein each coordinate is a sum of a pure radial sum and a linear term, or an affine mapping, and may be filtered for antialiasing afterward. Such transformations and filtering, as well as other applicable warping functions, are discussed in Nur Arad, *Image Warp Design Based on Variational Principles*, a Ph.D thesis from Tel Aviv State University and available therefrom, and in G. Wolberg, *Digital Image Warping* (IEEE Society Press, Los Alamitos, Calif., 1992), and Paul Heckbert, *Fundamentals of Texture Mapping and Image Warping*, a Masters Thesis from the University of California at Berkeley and available therefrom, all of which are included herein by reference for all purposes as if set forth herein in full.

FIG. 4 is a flow diagram of a method for morphing between a reference image and a comparison image according to a trustworthiness factor, according to some embodiments. In this example, a reference image is received (401), for example as discussed in conjunction with 201 of FIG. 2.

A comparison image may be selected (402). A comparison image may be any image differentiable from the reference image. In some embodiments, a comparison image may be automatically selected, for example by selecting an object of a similar (or identical) type as the reference image (for example, both faces or both buildings), optionally with a high degree of difference/distinguishability from the reference image. In some embodiments, a comparison image may be selected or provided by a user.

Features may be selected for the reference image (403), for example as discussed in conjunction with 302 of FIG. 3.

Features may be selected for the comparison image (404), for example as discussed in conjunction with 302 of FIG. 3.

A display image may be created that is the result of interpolating between the reference image and the comparison image to a degree reflective of the trustworthiness factor (405), for example using a scale in which "no" trust (which may for example be defined as a quantification failing to meet or exceed a threshold, such as the minimum value, or a fraction such as one quarter of the maximum value) is represented by the image of the comparison image and "full" trust is represented as an image of the reference image, and graphical interpolation techniques such as morphing techniques known to those skilled in the art may be applied to create an intermediate image between the comparison image and the reference image, related to (for example proportional to) the placement of the trustworthiness factor between "no" and "full" trust, represented by the comparison image and the reference image respectively.

As an example of image morphing, based on features (such as control points, lines and/or curves), both the reference image and the comparison image may be deformed according to the trustworthiness factor, and the display image may be calculated by interpolating between the two deformed images. In various embodiments, morphing may be done using mesh warping, field morphing, radial basis functions/ thin plate splines, energy minimization, multilevel free-form deformation, or other techniques known in the art. Such techniques are described in detail, for example, in G. Wolberg, *Recent Advances in Image Morphing*, Proc. Computer Graphics Intl. '96, Pohang, Korea, June 1996, which is incorporated herein by reference in its entirety as if set forth herein.

In some embodiments, an unfamiliar object may be associated with a familiar object, e.g. the same blend of familiar and unfamiliar object may be used repeatedly for authentication. In some embodiments, a familiar object may remain fixed (either globally or associated with a URL, message sender, or other address) and an unfamiliar object may change per visit or per message, e.g. may be rotated or selected pseudorandomly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for indicating trustworthiness, comprising:
   receiving a reference image;
   receiving a specification of features associated with the reference image;
   receiving an electronic document;
   determining a trustworthiness factor associated with the electronic document;
   creating a modified reference image, wherein creating the modified reference image includes modifying the reference image to a degree corresponding to the trustworthiness factor, wherein a lower trustworthiness factor corresponds to a greater modification relative to a higher trustworthiness factor, and wherein modifying the reference image to a degree corresponding to the trustworthiness factor includes warping the reference image based on moving the features to a degree corresponding to the trustworthiness factor, and interpolating points to generate the modified reference image; and
   displaying the modified reference image.

2. The method of claim 1, wherein the electronic document is an email.

3. The method of claim 1, wherein the electronic document is a web page.

4. The method of claim 1, wherein the trustworthiness factor relates to an originator of the electronic document.

5. The method of claim 1, wherein the trustworthiness factor relates to analysis of content of the electronic document.

6. The method of claim 1, wherein the electronic document relates to an item for sale, and wherein the trustworthiness factor relates to a seller of the item for sale.

7. The method of claim 1, wherein the reference image is at least one of an image of a face and an image of a geometric shape.

8. The method of claim 1, wherein the modified reference image is displayed in a browser chrome.

9. A computer program product for indicating trustworthiness, the computer program product being embodied in a non-transitory computer readable medium and comprising computer instructions for:
   receiving a reference image;
   receiving a specification of features associated with the reference image;
   receiving an electronic document;
   determining a trustworthiness factor associated with the electronic document;

creating a modified reference image, wherein creating the modified reference image includes modifying the reference image to a degree corresponding to the trustworthiness factor, wherein a lower trustworthiness factor corresponds to a greater modification relative to a higher trustworthiness factor, and wherein modifying the reference image to a degree corresponding to the trustworthiness factor includes warping the reference image based on moving the features to a degree corresponding to the trustworthiness factor, and interpolating points to generate the modified reference image; and displaying the modified reference image.

10. A computer-implemented method for indicating trustworthiness, comprising:
receiving a reference image;
receiving a comparison image;
receiving an electronic document;
determining a trustworthiness factor associated with the electronic document;
creating a modified reference image, wherein creating the modified reference image includes modifying the reference image to a degree corresponding to the trustworthiness factor, wherein a lower trustworthiness factor corresponds to a greater modification relative to a higher trustworthiness factor, and wherein modifying the reference image to a degree corresponding to the trustworthiness factor includes interpolating between the reference image and the comparison image to a degree corresponding to the trustworthiness factor, wherein a lower trustworthiness factor corresponds to greater similarity to the comparison image and a higher trustworthiness factor corresponds to greater similarity to the reference image; and
displaying the modified reference image.

11. The method of claim 10, further comprising receiving a specification of first features for the reference image and second features for the comparison image, and wherein interpolating between the reference image and the comparison image to a degree corresponding to the trustworthiness factor includes morphing between the reference image and the comparison image.

12. The method of claim 11, wherein the morphing is at least one of mesh warping, field morphing, and multilevel free-form deformation.

13. The method of claim 10, wherein the electronic document is at least one of an email and a web page.

14. The method of claim 10, wherein the trustworthiness factor relates to an originator of the electronic document.

15. The method of claim 10, wherein the trustworthiness factor relates to analysis of content of the electronic document.

16. The method of claim 10, wherein the electronic document relates to an item for sale, and wherein the trustworthiness factor relates to a seller of the item for sale.

17. The method of claim 11, wherein the first features are control points.

18. The method of claim 10, wherein the reference image is at least one of an image of a face and an image of a geometric shape.

19. The method of claim 10, wherein the modified reference image is displayed in a browser chrome.

20. A computer program product for indicating trustworthiness, the computer program product being embodied in a non-transitory computer readable medium and comprising computer instructions for:
receiving a reference image;
receiving a comparison image;
receiving an electronic document;
determining a trustworthiness factor associated with the electronic document;
creating a modified reference image, wherein creating the modified reference image includes modifying the reference image to a degree corresponding to the trustworthiness factor, wherein a lower trustworthiness factor corresponds to a greater modification relative to a higher trustworthiness factor, and wherein modifying the reference image to a degree corresponding to the trustworthiness factor includes interpolating between the reference image and the comparison image to a degree corresponding to the trustworthiness factor, wherein a lower trustworthiness factor corresponds to greater similarity to the comparison image and a higher trustworthiness factor corresponds to greater similarity to the reference image; and
displaying the modified reference image.

* * * * *